(12) United States Patent
Price

(10) Patent No.: US 6,396,846 B1
(45) Date of Patent: May 28, 2002

(54) ISDN CHANNEL UNIT-RESIDENT MECHANISM FOR USURPING TIME SLOTS ASSIGNED TO ADJACENT CHANNEL BANK CARD SLOT

(75) Inventor: John P. Price, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/130,805

(22) Filed: Aug. 7, 1998

(51) Int. Cl.[7] .................................................. H04J 3/16
(52) U.S. Cl. ....................................................... 370/458
(58) Field of Search ................................ 370/442, 347, 370/351, 352, 252, 254, 480, 241, 522, 524, 461, 462, 458, 445, 341, 346, 348, 350, 337, 320, 247, 449, 439, 438, 437, 431; 340/825.5, 825.51, 825.52

(56) References Cited

U.S. PATENT DOCUMENTS 5,805,203 A * 9/1998 Horton ........................ 370/458
5,825,811 A * 10/1998 Souissi ....................... 370/458
6,175,737 B1 * 1/2001 Kao ............................ 455/447

* cited by examiner

*Primary Examiner*—Dang Ton
(74) *Attorney, Agent, or Firm*—Allen, Dyer, Doppelt, Milbrath & Gilchrist, P.A.

(57) ABSTRACT

To obviate the need to install a null card in a non-ISDN configured channel bank, an ISDN channel unit is modified to include an interface circuit that uses NMQ signals clocked by the bank controller on a shared NMQ lead to artificially generate a 'pseudo NMP' signal. This pseudo NMP signal and the NMQ signals enable the ISDN channel unit to conduct serial message exchanges with the bank controller during polling of an adjacent empty backplane card slot. The bank controller unit is thereby effectively 'spoofed' into thinking that a channel unit is installed in the empty backplane slot. It releases a pair of time slots associated with the adjacent empty card slot, so that the spoofing ISDN channel unit can use the usurped time slots for 2B+D ISDN communications.

18 Claims, 3 Drawing Sheets

ISDN CHANNEL UNIT-RESIDENT MECHANISM FOR USURPING TIME SLOTS ASSIGNED TO ADJACENT CHANNEL BANK CARD SLOT

FIELD OF THE INVENTION

The present invention relates in general to digital communication systems and networks, and is particularly directed to a mechanism for enabling a channel bank-installed ISDN channel unit to controllably 'spoof' a channel bank controller to release time slots assigned to a different card slot, and thereby enable the usurping channel unit to conduct 2B+D ISDN communications without the use of a null card.

BACKGROUND OF THE INVENTION

Integrated services digital network (ISDN) communication networks, such as the 'extended distance' ISDN communication network architecture diagrammatically illustrated in FIG. 1, enable telephone service providers to supply multiple types of signalling channels from a central office to a network termination interface at a customer premises site. In the reduced complexity network example of FIG. 1, a PCM communication link 10, such as a T1 data rate (1.544 Mb/s) optical fiber link, provides digital communication connectivity between a central office (CO) channel bank 20, such as an AT&T SLC series 5 channel bank, at a 'west' end of the PCM link, and customer premises equipment (CPE) served by a channel bank 30 located at a remote, 'east' end 40 of the link.

The west end central office 20 is coupled by way of a link 21 to a central office switch 22 (such as a 5ESS switch manufactured by AT&T), and includes a line interface unit (LIU) 23 that terminates the west end of the PCM link 10. The east end channel bank 30 has an LIU 33 coupled to the PCM link, and includes a plurality of U-BRITE circuit cards 35 coupled via associated local loops (twisted tip/ring pair) 37 to customer premises equipment (CPE) 40. As shown in FIG. 2, the line interface unit 33 of the east end channel bank 30 is coupled over an internal PCM bus 34 to a plurality of ISDN channel units or U-BRITE circuit cards 35 installed within card slots of the channel bank's backplane 36. Each respective U-BRITE circuit card 35 is dedicated to providing extended ISDN service to remote customer premises equipment via a local loop 37 that connects the channel unit with digital communication equipment 40 installed at the customer premises.

Under control of a communications control processor or channel bank control unit (BCU) 38, a carrier system transceiver within the line interface unit 33 is operative to transmit and receive standard 2B+D ISDN data traffic over the PCM digital data link 10. In order to interface a digital subscriber loop (DSL) over the local loop (twisted pair) 37 to the customer premises equipment 40, each U-BRITE card 35 includes a line transceiver and an associated line interface, which are also operative under microprocessor control to interface PCM data with the line interface unit 33, and to transmit and receive basic rate 2B1Q ISDN signals over the local loop 37 to and from the customer premises equipment 40.

In some channel banks, the bank controller unit may not be designed to recognize ISDN common cards (ISDN channel units) installed in the channel bank's backplane. Since ISDN channel units require the use of three time slots (i.e., two bearer (B1 and B2) and one data (D)), and the bank controller assigns only two time slots per backplane card slot, it has been customary practice, as shown at 39 in FIG. 2, to install what is commonly known in the industry as a 'null' card 39, in a card slot that is immediately adjacent to the card slot containing an ISDN channel unit or U-BRITE card 35.

While containing no transceiver circuitry of its own, the null card is configured to appear to the BCU as a standard POTS card, so that the bank controller unit will release or assign (a pair of) time slots associated with the null card's backplane card slot. Since the null card does not transmit, these time slots are available for use as third time slots of adjacent U-BRITE cards.

Although installing a null card is one way to induce the bank controller unit to release two otherwise unused time slots for utilization by adjacent ISDN channel cards, it requires that the ISDN service provider purchase and physically install a null card for every two ISDN cards employed.

SUMMARY OF THE INVENTION

In accordance with the invention, the above-described cost and labor penalty of having to purchase and install null cards in an ISDN channel bank is effectively obviated by taking advantage of an a priori search sequence that is conducted by the bank controller unit whenever a service request (SR) signal is generated by a channel unit, irrespective of the backplane card slot in which the channel unit sourcing the service request is installed. In particular, it has been observed that the channel bank controller unit will always respond to a service request by polling the card slots for the presence of channel units, beginning with the lowest numbered card slot, and then proceeding sequentially through the remaining (twelve per digroup) card slots of the backplane.

Unfortunately, even with knowledge of the order of the polling sequence, and the fact that each channel unit can read each of the messages being clocked over a common channel unit, there is the problem that the card slot addresses lines (including a selectively clocked enable or "not message page (NMP)" line and an asynchronous clock or "not message quadrant (NMQ)" line) are not common to all channel units. Instead, for each digroup of card slots, the address lines are selectively wired in sets or groups (two NMQ lines for two sets of six card slots each, and six NMP lines respective assigned to non-adjacent pairs of card slots (1/7, 2/8, 3/9, 4/10, 5/11 and 6/12)). As a consequence, each channel unit cannot determine when the bank controller is addressing another (in particular, the adjacent) card slot.

As will be described, this problem is obviated in accordance with the invention, by employing the NMQ clocking signals generated by the bank controller for a given plurality of channel units, of which an ISDN channel unit of interest is a member, to artificially generate a 'pseudo NMP' signal, the duration of which corresponds to a period of time slightly longer than the length of time that the sequence of NMQ signals is being asserted by the bank controller. This combination of NMQ signals on the NMQ lead and the pseudo NMP signal enables the ISDN channel unit of interest to conduct serial message exchanges (read/write operations) with the bank controller during an interrogation interval associated with another (the adjacent) backplane card slot. The bank controller unit is thereby effectively fooled or 'spoofed' into thinking that a channel unit is actually installed in that backplane slot, so that it releases the pair of time slots associated with that adjacent card slot, and thereby allows the ISDN channel unit to usurp one of the two released time slots it needs for its set of three (2B+D) ISDN channels.

For this purpose, upon being installed in the channel bank, the modified ISDN channel unit according to the present invention generates a communication service request (SR) signal. As described above, this communication service request signal will stimulate the channel bank controller to poll each channel unit installed in the channel bank, so that the bank controller may ascertain which circuit card slots actually contain channel units. Such polling of the card slots is conducted by means of the set of selectively clocked NMP and NMQ address lines and an associated common message (MSG) line to which the card slots are connected.

The modified ISDN channel unit of the present invention includes a set of interface logic that is coupled in circuit between the NMP and NMQ input leads and the message exchange circuitry of the channel unit to which the NMP and NMQ leads are normally directly connected. The interface logic has an output gate to an input of which the NMP input lead of the backplane communication bus is coupled. The output of this output gate is coupled to control the state of an NMP output lead to the channel unit's message exchange circuitry.

Whenever the channel unit sees its NMP lead go low, it changes the state of an enable lead, which is coupled to an input gate, and is maintained in a prescribed logic state for a duration that extends over the length of time that the bank controller polls the card slot of the interrogated channel unit of interest and the immediately adjacent downstream card slot. This input gate is also coupled to the NMQ lead for that channel unit. As long as the enable lead is asserted in this logic state, the output of the input gate will follow the changes in state (clocking) of the NMQ lead by the bank controller.

The output of the input gate is coupled to the clear input of a divide-by-N counter and to the reset input of an output flip-flop. The output flip-flop is clocked by the output of a counter, when the counter rolls over. When enabled, the counter is coupled to count high speed clock pulses. The parameters of the counter are such that it will not reach its rollover count limit prior to the expiration of one period of the NMQ signal on the NMQ lead.

As a long as the NMQ lead is being clocked by the bank controller unit, it will repeatedly reset the counter and the output flip-flop, preventing the counter from rolling over and clocking the output flip-flop to a state that changes the state of the NMP output lead.

However, when the bank controller unit terminates its interrogation of the present card slot, it ceases clocking the NMQ lead, and also changes the state of the NMP input lead. The lack of a transition of the NMQ lead will eventually allow the counter to roll over, so that the counter will clock the output flip-flop, changing the state of the NMP output lead.

Although the channel unit cannot read the state of the adjacent card's NMP lead, the availability of the NMQ lead it shares with the adjacent card slot enables the channel unit to artificially generate a 'pseudo NMP' signal on its NMP output lead, which has a duration that is slightly longer than the length of time that the sequence of NMQ signals is being asserted by the bank controller. This combination of clocked NMQ signals on the shared NMQ lead and the pseudo NMP signal enables the ISDN channel unit to conduct serial message exchanges with the bank controller during an interrogation interval associated with the adjacent card slot. The bank controller unit is thereby effectively 'spoofed' into thinking that a channel unit is actually installed in that backplane slot, so that it releases the pair of time slots associated with that adjacent card slot, and allows the ISDN channel unit to usurp one of the two released time slots it needs for its set of three (2B+D) ISDN channels.

Eventually, the bank controller unit terminates its interrogation of the adjacent card slot, as it ceases clocking the NMQ lead for that card slot. The lack of a high-to-low transition of the NMQ lead to the channel unit's interface circuit will eventually allow the counter to roll over subsequent to the last NMQ transition, so that the counter will clock the output flip-flop, whereby the output gate changes the NMP output lead, terminating the pseudo NMP signal. The enable lead is then de-asserted, so that the output of the input gate will no longer follow changes in state of the NMQ lead, and therefore will not repeatedly clear the counter and the output flip-flop. As a result, the output gate will maintain the NMP output lead de-asserted.

DETAILED DESCRIPTION

Figure 1:
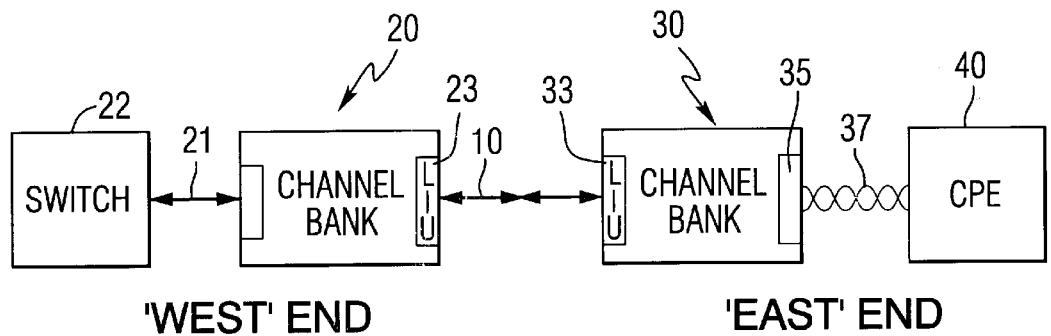
FIG. 1 diagrammatically illustrates an extended distance ISDN communication network architecture.
Figure 2:
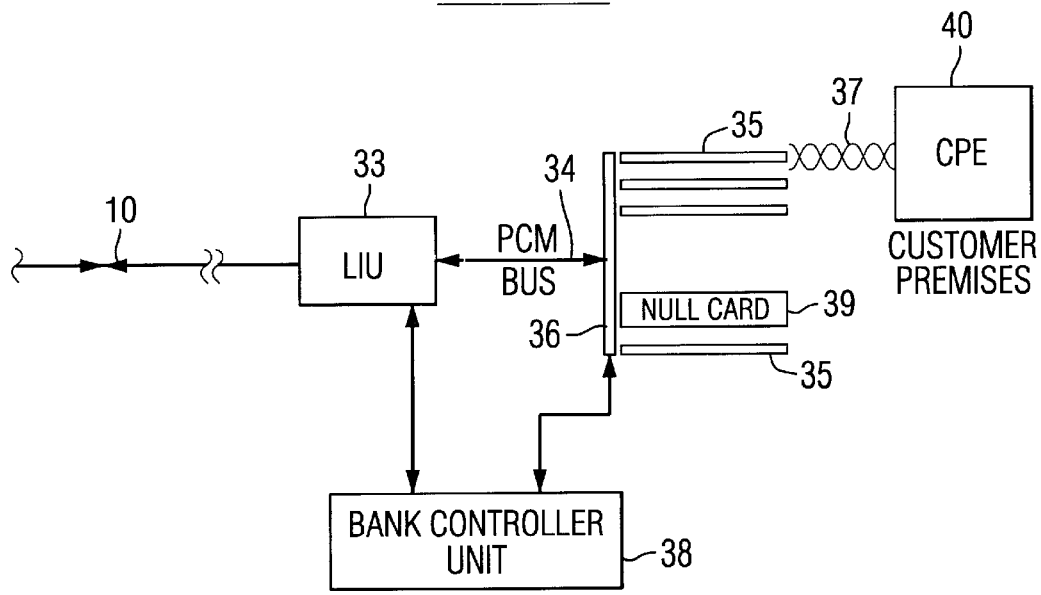
FIG. 2 shows a channel bank of the network of FIG. 1 terminating the PCM link by a line interface unit coupled 32 to a plurality of ISDN channel units installed in the channel bank's backplane.

Before describing in detail the ISDN channel unit-installed, bank controller spoofing and time slot usurping mechanism in accordance with the present invention, it should be observed that the invention resides primarily in what is effectively a prescribed arrangement of conventional communication circuits and associated components. Consequently, the configuration of such circuits and components and the manner in which they are interfaced with other communication network equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations described herein are primarily intended to show the major components of a wireless local loop network in a convenient functional grouping and processing sequence, whereby the present invention may be more readily understood.

As pointed out briefly above, the bank controller spoofing and time slot usurping mechanism of the present invention is operative to artificially generate pseudo address signals, to make the channel bank controller unit think that the card or channel unit with which the bank controller is communicating is actually located in a different (adjacent) card slot. The bank controller is thereby effectively 'spoofed' into releasing the time slots associated with that different card slot, and thereby supplement the pair of time slots assigned by the bank controller to the card slot of the usurping channel unit, enabling a usurping ISDN channel unit to conduct 2B+D ISDN communications, using its own pair of assigned time slots, and one of the two time slots usurped from the other (adjacent) card slot.

Figure 3:
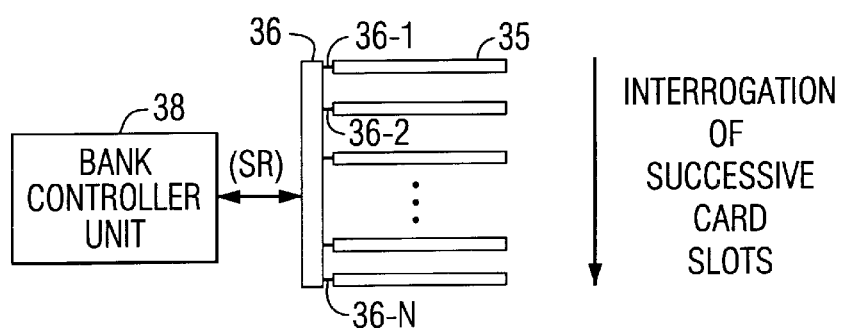
FIG. 3 diagrammatically illustrates the manner in which a channel bank controller begins a polling sequence of channel units at the lowest numbered card slot of a backplane digroup.

The ability of the present invention to artificially generate pseudo address signals is based upon the fact that, in response to a service request signal, the channel bank controller unit will always poll the card slots in a prescribed order, irrespective of the backplane card slot in which the channel unit sourcing the request is installed. In particular, as illustrated diagrammatically in FIG. 3, analysis of various channel bank controllers employed in the telecommunications industry has revealed that the bank controller unit 38 will always begin a polling sequence of the channel units (CUs) 35 at the lowest numbered card slot 36-1 of a backplane digroup, and then proceed sequentially through the remaining card slots 36-2, . . . , 36-N (e.g., twelve per digroup) of the backplane 36.

Pursuant to the invention, advantage is taken of this a priori search sequence, to obviate the fact that each channel unit does not have access to and thereby cannot read the state of each of the channel unit address lines (the various NMP and NMQ lines) of a communication bus 104. The present invention makes use of the NMQ clocking signals employed by the bank controller, and an internally generated enable signal that it asserts at the beginning of its own communication cycle with the bank controller, in order to artificially generate a pseudo NMP signal, and make it appear to the bank controller that an active channel unit is installed in the adjacent (but empty) card slot. The bank controller unit will then release its associated pair of time slots to the same channel unit (card slot) to which it has just assigned a pair of time slots.

Figure 4:
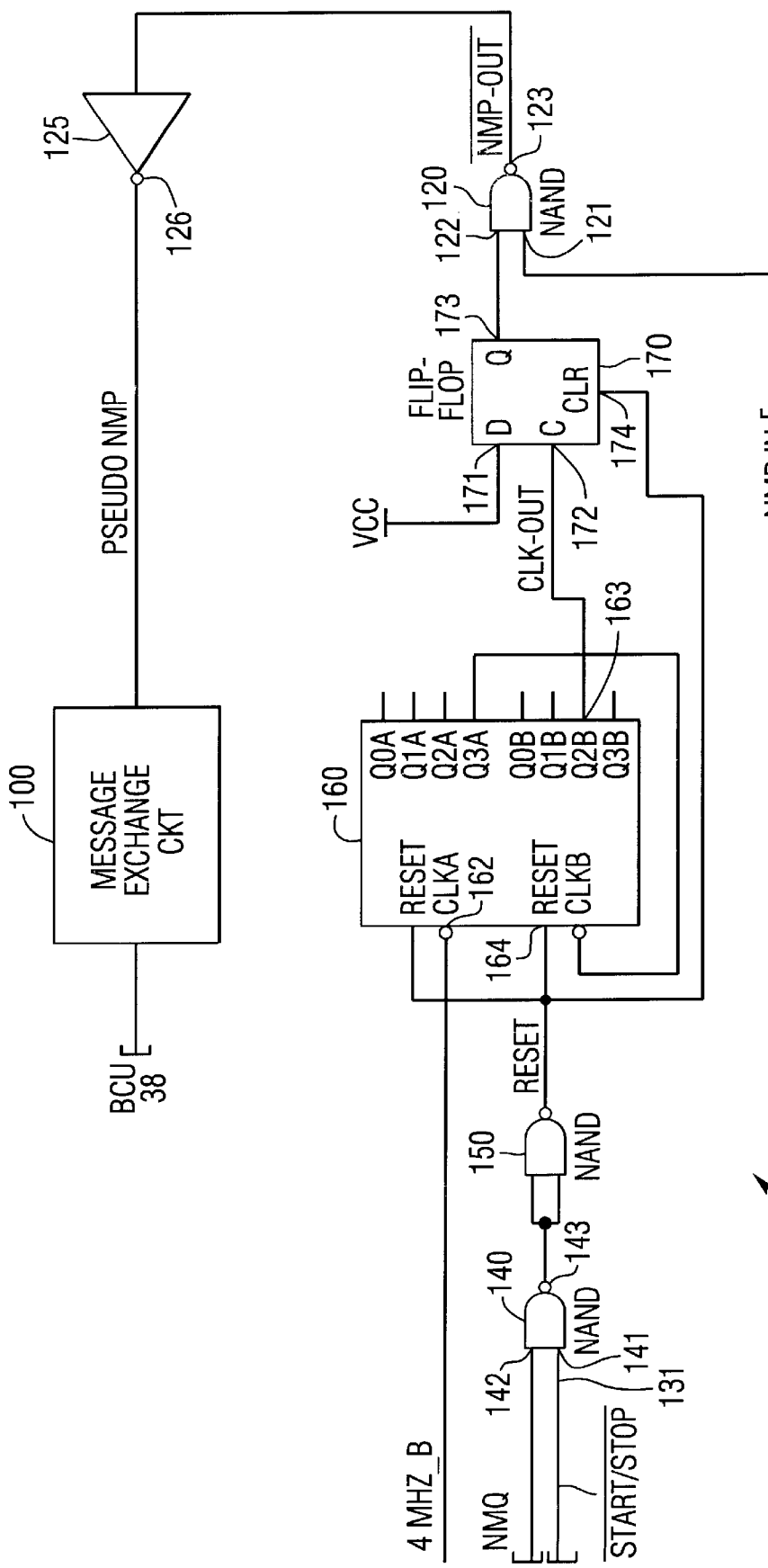
FIG. 4 is a logic circuit diagram of auxiliary channel unit circuitry for artificially generating a pseudo NMP signal in accordance with the present invention.
Figure 5:
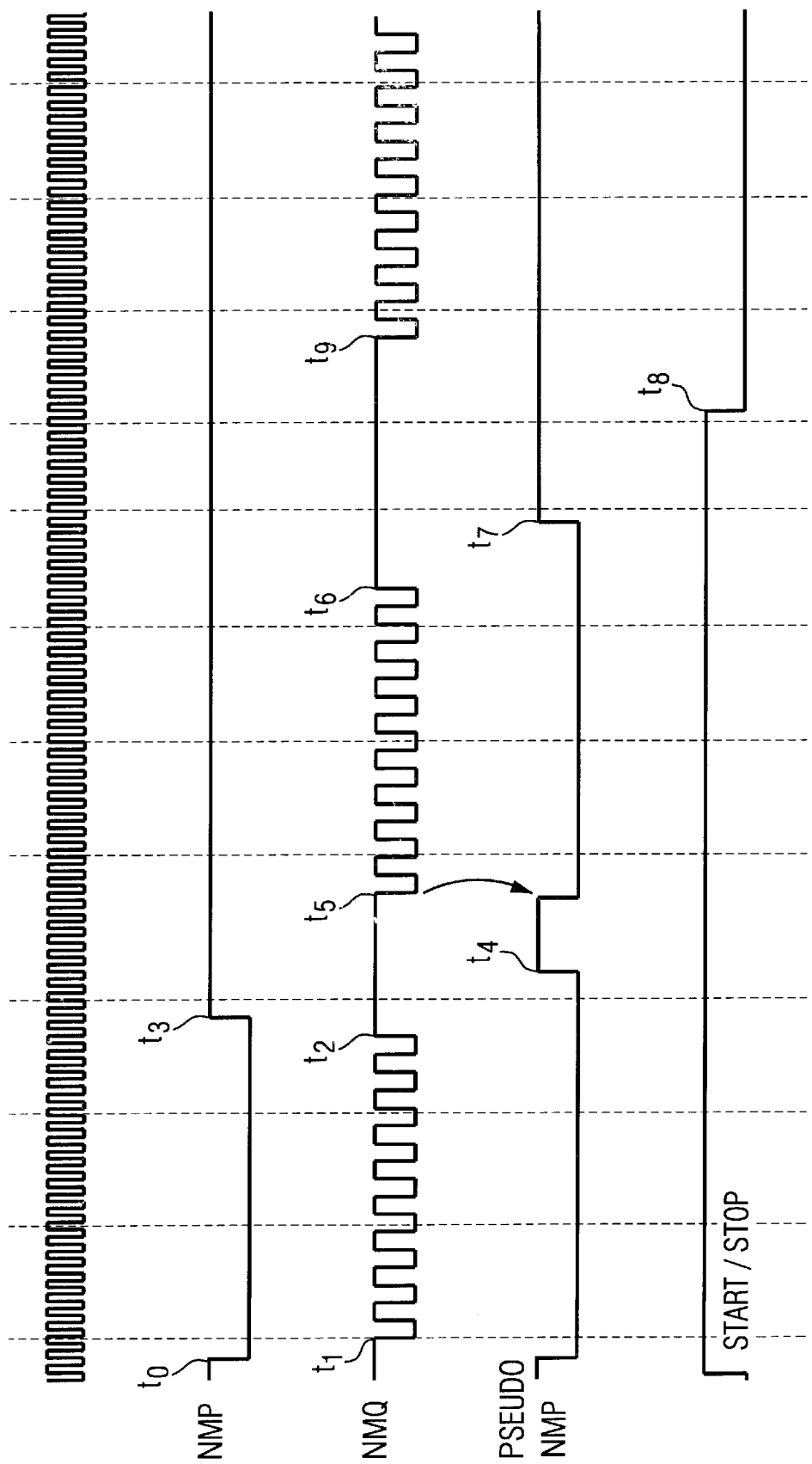
FIG. 5 is a timing diagram associated with the operation of the logic circuit of FIG. 4.

The auxiliary channel unit circuitry for generating a pseudo NMP signal will be described with reference to the logic circuit diagram of FIG. 4 and the associated timing diagram of FIG. 5. As shown in FIG. 4, the 'spoofing' interface logic circuit 110 of the present invention is coupled in circuit between the NMP and NMQ leads and message exchange circuitry 100 of the channel unit (to which NMP and NMQ leads are normally connected).

The NMP lead of the backplane communication bus is coupled to a first input 121 of an output NAND gate 120 the output 123 of which is coupled through an inverter/buffer 125 to the NMP lead of the circuitry 100. As long as the NMP lead is asserted low (logical '0'), the output 123 of the output NAND gate 120, from which the complement of the pseudo NMP signal is to be generated, is asserted high (logical '1'). This output is inverted by inverter/buffer 125, so that a low logic level pseudo NMP signal is also generated at the output 126 of the inverter 125, regardless of the state of a second input 122 to the output NAND gate 120, which is derived from the Q output 173 of a flip-flop 170.

Whenever the channel unit of interest sees its NMP lead go low, it changes the state of an enable lead 131 from low to high. This lead is coupled through an inverter to a first input 141 of a NAND gate 140, and is held high for a duration that extends over the length of time that the bank controller polls the card slot of the interrogated channel unit of interest and the immediately adjacent downstream card slot. A second input 142 of NAND gate 140 is coupled to the NMQ lead for that channel unit.

As shown in FIG. 6, as the bank controller sequentially polls a respective card slot of the back plane, at time t0, it asserts the NMP lead low for that card slot, and then clocks its associated NMQ lead between opposite logic states, so that if a channel unit (or POTS card) is installed in the interrogated card slot, it may exchange messages with the bank controller unit via the communication bus's message line MSG. As long as the enable lead 131 is asserted high (logical '1'), the output 143 of the NAND gate 140 will follow the changes in state of the NMQ lead, shown beginning at time t1.

The output 143 of the NAND gate 140 is coupled through a buffering NAND gate inverter 150 to the clear or reset input 164 of a divide-by-N (e.g., 128) counter 160, and to the reset or clear input 174 of flip-flop 170. The clock input 172 of flip-flop 170 is coupled to the output 163 of counter 160. The D input 171 of flip-flop 170 is hard-wired high, to Vcc as shown. As pointed out above, the Q output 173 of the flip-flop 170 is coupled to the second input 122 of output NAND gate 120.

Counter 160 has an input 161 coupled to receive a high speed (e.g., 4 MHz) clock pulse signal. As long as counter 160 is enabled, it is sequentially incremented by the clock pulse signal. The parameters of counter 160 are such that it will not reach its rollover count limit (e.g., a count value of 128) prior to the expiration of one period of the NMQ signal.

As a consequence, as long as the NMQ lead is being clocked by the bank controller unit, the successive low transitions of the NMQ lead (beginning at time t1 and ending at time t2) will repeatedly reset or clear the counter 160 (and also flip-flop 170), preventing the output 163 of the counter from clocking the flip-flop 170.

However, once the bank controller unit terminates its interrogation of the present card slot, it ceases clocking the NMQ lead for the interrogated card slot at time t2, and changes the state of the NMP lead (from low to high) at time t3. The lack of a high-to-low transition of the NMQ lead will eventually allow the counter 160 to roll over, at some time differential (t4−t2) after the last NMQ transition at time t2, so that the output 163 of the counter 160 will clock (a '1' into) the flip-flop 170 at time t4, causing its Q output 173 to go high, whereby the NAND gate 120 changes the state of the pseudo output lead 106 from low to high.

As pointed out above, although the channel unit in the card slot of interest does not have access to and therefore cannot read the state of the NMP lead of the adjacent card slot (in which no channel unit is installed), its NMQ lead is shared with that card slot. The invention uses the availability of this shared NMQ lead to generate a 'pseudo NMP' signal having a duration slightly longer than the length of time that the sequence of NMQ signals is being asserted by the bank controller.

This combination of clocked NMQ signals on the NMQ lead and the pseudo NMP signal enables the ISDN channel unit of interest to conduct serial message exchanges (read/write operations) with the bank controller during an interrogation interval associated with another (the adjacent empty) backplane card slot. The bank controller unit is thereby effectively fooled or 'spoofed' into thinking that a channel unit is actually installed in that backplane slot, so that it releases the pair of time slots associated with that adjacent card slot, and thereby allows the ISDN channel unit to usurp one of the two released time slots it needs for its set of three (2B+D) ISDN channels.

For this purpose, the NMP lead is coupled to a second input 142 of NAND gate 140. Since the enable lead 131 is asserted high, the successive transitions on the NMQ lead will cause the output 143 of the NAND gate 140 to alternately change state at the rate of change of the NMQ lead, shown beginning at the initial high-to-low transition on the NMQ lead at time t5. This high-to-low transition of the NMQ lead at time t5 clears the counter 160, and resets flip-flop 170. As a consequence, the Q output 173 of the flip-flop 170 goes low, which changes the output 123 of NAND gate 120, from low-to-high, and thereby causes the state of the pseudo NMP lead 106 to go low.

As in the scenario described above, as long as the NMQ lead is being clocked by the bank controller unit, the successive high-to-low transitions of the NMQ lead (beginning at time t5 and ending at time t6) will repeatedly reset or clear the counter 160 (and also flip-flop 170), preventing the output 163 of counter 160 from clocking the flip-flop 170, and maintaining the pseudo NMP output lead low. As pointed out earlier, this enables the channel unit to conduct message exchanges with the bank controller as through a channel unit is installed in the adjacent card slot. As a result, the bank controller is 'spoofed' into releasing the two time slots of the adjacent card slot for use by the usurping channel unit.

Eventually, the bank controller unit terminates its interrogation of the adjacent card slot, as it ceases clocking the NMQ lead for the interrogated card slot at time t6, and changes the state of the NMP lead (from low to high) for that card slot. The lack of a high-to-low transition of the NMQ lead will eventually allow the counter 160 to roll over at time t7 subsequent to the last NMQ transition at time t6. At that time, the output 163 of the counter 160 will clock (a '1' into) the flip-flop 170, causing its Q output 173 to go high, whereby the NAND gate 120 changes the state of the pseudo output lead 106 from low to high.

As pointed out above, via the enable lead 131, the input 141 of a NAND gate 140 has been held high for a duration sufficient for the channel unit to exchange messages with the bank controller during its interrogation of both the current channel unit's card slot and the immediately adjacent downstream card slot. At time t8, the channel unit enable lead changes state from high to low. Since this lead is now low, the output 143 of the NAND gate 140 will no longer follow changes in state of the NMQ lead, shown beginning at time t9, and will not repeatedly clear counter 160 and flip-flop 170. As a result, the output 123 of NAND gate 120 will be held in a low state, maintaining the pseudo NMP output lead in the high state to which it transitioned at time t7, as described above.

As will be appreciated from the foregoing description, the problem of having to purchase and install a null card for every two ISDN card slots of a non ISDN configured channel bank is effectively obviated in accordance with the channel unit interface circuit of the present invention, which uses the NMQ clocking signals generated by the bank controller to artificially generate a 'pseudo NMP' signal. This pseudo NMP signal plus the NMQ signals on the NMQ lead enable the interface circuit-equipped ISDN channel unit to conduct serial message exchanges with the bank controller during an interrogation interval associated with the adjacent backplane card slot.

The bank controller unit is thereby effectively 'spoofed' into thinking that a channel unit is actually installed in that backplane slot, so that it releases a pair of time slots associated with that adjacent card slot, and thereby allows the interface circuit-equipped ISDN channel unit to usurp one of the two released time slots for its three (2B+D) ISDN channels.

While I have shown and described an embodiment in accordance with the present invention, it is to be understood that the same is not limited thereto but is susceptible to numerous changes and modifications as are known to a person skilled in the art, and I therefore do not wish to be limited to the details shown and described herein, but intend to cover all such changes and modifications as are obvious to one of ordinary skill in the art.

What is claimed is:

1. For use with a communication system channel bank having a plurality of channel unit installation locations in which respective channel units are installable, and having a channel bank controller that is operative to allow communications to be conducted by a channel unit during no more than a prescribed plurality of time slots assigned to its installation location, a method of enabling a first channel unit installed in a first installation location to conduct communications during its assigned plurality of time slots and also during a time slot assigned to a second installation location in which no channel unit is installed, said method comprising the steps of:

(a) causing said first channel unit to generate a communication service request signal that stimulates said channel bank controller to sequentially poll channel units installed in successively adjacent ones of said plurality of channel unit installation locations, and thereby cause digital messages stored therein to be clocked to said bank controller, so that said bank controller may determine which installation locations contain channel units that desire to conduct communications;

(b) in response to being polled by said bank communications controller, causing said first channel unit to present to said bank controller a digital message associated with said first channel unit conducting communications during a first plurality of time slots assigned to said first channel unit installation location; and (c) in association with said bank controller polling said second channel unit installation location, causing said first channel unit to present to said bank controller a digital message that appears to said bank controller to be sourced from a second channel unit as though installed in said second installation location, but is associated with said first channel unit conducting communications during a time slot assigned to said second channel unit installation location.

2. A method according to claim 1, wherein said channel units comprise integrated services digital network ISDN channel units, that are operative to conduct communications during three time slots associated with two bearer B1 and B2 channels and one data D channel, and wherein said prescribed plurality of time slots is two time slots.

3. For use with a communication system channel bank having a plurality of channel unit installation locations in which integrated services digital network (ISDN) channel units are installable, and having a channel bank controller that is operative to allow communications to be conducted by a respective ISDN channel unit during only two time slots assigned to its installation location, a method of enabling a first ISDN channel unit installed in a first installation location of said channel bank to conduct 2B+D ISDN communications through the use of the two time slots assigned to said first installation location, and one of the two time slots assignable to a second installation location, said method comprising the steps of:

(a) causing said ISDN first channel unit to generate a communication service request signal that stimulates said channel bank controller to sequentially poll successively adjacent channel unit installation locations, so that said bank controller may determine which installation locations contain channel units;

(b) in response to being polled by said bank communications controller, causing said first ISDN channel unit to provide said bank controller with a message representative of said first ISDN channel unit's use of its two assigned time slots; and (c) in association with said bank controller polling said installation location, causing said first ISDN channel unit to provide to said bank controller with a message that appears to be sourced from a channel unit as though installed in said second installation location, and is representative of use of the two time slots assigned to said second installation location.

4. A method according to claim 3, wherein step (a) comprises generating, from said first ISDN channel unit, a communication service request signal that stimulates said channel bank controller to controllably drive address lines for said channel units, so as to sequentially address successively adjacent channel unit installation locations, step (b) comprises, in response to being polled by said bank communications controller, causing said first ISDN channel unit to clock out to said bank controller a first digital message representative of said first ISDN channel unit's desire to use its two assigned time slots, and step (c) comprises, subsequent to a prescribed period of time after being polled by said bank communications controller, and at a time associated with said bank controller driving address lines for addressing said second installation location, causing said first ISDN channel unit to clock out to said bank controller a second digital message, that appears to said bank controller to be sourced from a second ISDN channel unit as though installed in said second installation location, and thereby representative of said second channel unit's use of the two time slots assigned to said second installation location, but is associated of said first ISDN channel unit's use one of the two time slots assigned to said second installation location.

5. For use with a communication system channel bank having plural physical slots, in which integrated services digital network ISDN channel units are installable, and having a channel bank controller that is operative to allow communications to be conducted by an ISDN channel unit during only those time slots that it releases to the physical slot containing said ISDN channel unit, an interface circuit, coupled in circuit with address lines from said channel bank controller and said physical slot, for enabling said channel unit to conduct ISDN communications using time slots assigned thereto, and an additional time slot assigned to another physical slot, said interface circuit comprising:

a first logic circuit which is operative, in response to said channel unit being polled by said bank communications controller, to enable said channel unit to exchange with said bank controller a digital message associated with said channel unit conducting communications during a first plurality of time slots assigned to said channel unit's physical slot; and a second logic circuit, which is operative, in association with said bank controller polling said another physical slot, to enable said channel unit to exchange with said bank controller a digital message that appears to said bank controller to be sourced from a channel unit installed in said another physical slot, prompting said bank controller to release time slots associated with said another physical slot for use by said respective channel unit.

6. An interface circuit according to claim 5, wherein said first logic circuit is configured to couple to said channel unit's message exchange circuitry an NMP signal asserted by said bank controller for said channel unit.

7. An interface circuit according to claim 6, wherein said second logic circuit is configured to selectively couple to said channel unit's message exchange circuitry a pseudo enable signal, derived in accordance with clock signals asserted on a clock lead from said bank controller, in the course of said bank controller polling said another physical slot.

8. An interface circuit according to claim 7, wherein said second logic circuit is configured to define the duration of said pseudo enable signal in accordance with the assertion of said clock signals on said clock lead from said bank controller, in the course of said bank controller polling said another physical slot.

9. An interface circuit according to claim 8, wherein said second logic circuit is configured to begin the duration of said pseudo enable signal upon the assertion of said clock signals on said clock lead from said bank controller in the course of said bank controller polling said another physical slot, and to terminate the duration of said pseudo enable signal subsequent to the end said clock signals on said clock lead from said bank controller in the course of said bank controller polling said another physical slot.

10. An interface circuit according to claim 9, wherein said channel unit is operative to controllably enable said second logic circuit for a duration that extends over a length of time that said bank controller polls the physical slot of said channel unit and said another physical slot.

11. An interface circuit according to claim 10, wherein said channel unit is operative to enable said second logic circuit for said duration in response to said channel unit being polled by said bank communications controller.

12. A method of operating a communication system channel bank having a plurality of channel unit installation locations in which channel units are installable, and having a channel bank controller that is operative to allow communications to be conducted by a respective channel unit during no more than a prescribed plurality of time slots assigned to its installation location, said method comprising the steps of:

(a) installing a first channel unit in a first installation location; and (b) enabling said first channel unit to conduct communications during its assigned time slots and also during a time slot assigned to a second installation location having no channel unit installed therein by performing the steps of:

(b1) generating, from said first channel unit, a communication service request signal that stimulates said channel bank controller to sequentially poll channel units installed in successively adjacent ones of said plurality of channel unit installation locations to determine which installation locations contain channel units desiring to conduct communications, (b2) at a time subsequent to being polled by said bank communications controller, causing said first channel unit to generate a prescribed signal that represents to said bank controller that a second channel unit installed in said second installation location has generated a request to conduct communications during its assigned plurality of time slots, and (b3) enabling said first channel unit to conduct communications during a time slot assigned to said second channel unit installation location.

13. A method of operating a communication system channel bank having a plurality of channel unit installation locations in which channel units are installable, and having a channel bank controller that is operative to allow communications to be conducted by a respective channel unit during no more than a prescribed plurality of time slots assigned to its installation location, said method comprising the steps of:

(a) installing a first channel unit in a first installation location; and (b) enabling said first channel unit to conduct communications during its assigned time slots and also during a time slot assigned to a second installation location having no channel unit installed therein, wherein said channel units comprise integrated services digital network ISDN channel units, that are operative to conduct communications during three time slots associated with two bearer B1 and B2 channels and one data D channel, and wherein said prescribed plurality of time slots is two time, and wherein step (b) comprises the steps of:

(b1) generating, from a first ISDN channel unit, a communication service request signal that stimulates said channel bank controller to controllably drive NMQ and NMP lines for said channel units, so as to sequentially address ISDN channel units installed in adjacent channel unit installation locations, and cause digital messages to be clocked to said bank controller, so that said bank controller may determine which installation locations contain ISDN channel units desiring to conduct communications, and (b2) subsequent to being polled by said bank communications controller, and at a time associated with said bank controller driving NMQ and NMP lines for addressing said second channel unit installation location, causing said first ISDN channel unit to clock digital messages to said bank controller, which appear to said bank controller to be sourced from a second ISDN channel unit as though installed in said second installation location.

14. A method comprising the steps of:

(a) providing a communication system channel bank having a backplane containing a plurality of channel unit installation locations in which channel units are installable, and having a channel bank controller coupled to said backplane and being normally operative to allow communications to be conducted by a respective channel unit during no more than a prescribed plurality of time slots assigned to its channel unit installation location of said backplane;

(b) installing a first channel unit in a first channel unit installation location of said plurality of channel unit installation locations of said backplane;

(c) causing said bank controller to enable said first channel unit to conduct communications during its assigned time slots; and (d) for a second channel unit installation location having no channel unit installed therein, generating an indication to said bank controller that a channel unit is actually installed in said second channel unit installation location, and causing said bank controller to enable said first channel unit to conduct communications during a time slot assigned to said second channel unit installation location of said backplane having no channel unit installed therein.

15. The method according to claim 14, wherein said first channel unit is a first type of channel unit that is operative to conduct communications during time slots assigned thereto, and wherein step (d) comprises enabling said first channel unit to conduct communications during a time slot that would otherwise be assigned to said first type of channel unit if installed in said second channel unit installation location of said backplane.

16. The method according to claim 14, wherein step (c) comprises generating, from said first channel unit, a communication service request signal that stimulates said channel bank controller to sequentially poll channel units installed in successively adjacent ones of said plurality of channel unit installation locations of said backplane to determine which channel unit installation locations thereof contain channel units desiring to conduct communications, and wherein step (d) comprises, at a time subsequent to being polled by said channel bank communications controller, causing said first channel unit to generate a prescribed signal that represents to said channel bank controller that a second channel unit installed in said second channel unit installation location of said backplane has generated a request to conduct communications during its assigned plurality of time slots, and enabling said first channel unit to conduct communications during a time slot assigned to said second channel unit installation location of said backplane.

17. The method according to claim 14, wherein said channel units comprise integrated services digital network ISDN channel units, that are operative to conduct communications during three time slots associated with two bearer B1 and B2 channels and one data D channel, and wherein said prescribed plurality of time slots is two time slots.

18. A method according to claim 17, wherein step (c) comprises generating, from a first ISDN channel unit, a communication service request signal that stimulates said channel bank controller to controllably drive NMQ and NMP lines for said channel units, so as to sequentially address ISDN channel units installed in adjacent channel unit installation locations of said backplane, and cause digital messages to be clocked to said bank controller, so that said bank controller may determine which installation locations of said backplane contain ISDN channel units desiring to conduct communications, and wherein step (d) comprises, subsequent to being polled by said bank communications controller, and at a time associated with said bank controller driving NMQ and NMP lines for addressing said second channel unit installation location of said backplane, causing said first ISDN channel unit to clock digital messages to said bank controller, which appear to said bank controller to be sourced from a second ISDN channel unit as though installed in said second installation of said backplane.

* * * * *